United States Patent
Gupta et al.

(10) Patent No.: US 11,435,772 B2
(45) Date of Patent: Sep. 6, 2022

(54) SYSTEMS AND METHODS FOR OPTIMIZING ENERGY USAGE USING ENERGY DISAGGREGATION DATA AND TIME OF USE INFORMATION

(71) Applicants: Abhay Gupta, Cupertino, CA (US); Vivek Garud, Cupertino, CA (US)

(72) Inventors: Abhay Gupta, Cupertino, CA (US); Vivek Garud, Cupertino, CA (US)

(73) Assignee: BIDGELY, INC., Mountain View, CA (US)

( * ) Notice: Subject to any disclaimer, the term of this patent is extended or adjusted under 35 U.S.C. 154(b) by 0 days.

(21) Appl. No.: 14/845,189

(22) Filed: Sep. 3, 2015

(65) Prior Publication Data
US 2016/0070286 A1 Mar. 10, 2016

Related U.S. Application Data

(60) Provisional application No. 62/045,679, filed on Sep. 4, 2014.

(51) Int. Cl.
*G05F 1/66* (2006.01)
*G05B 13/02* (2006.01)
(Continued)

(52) U.S. Cl.
CPC ............. *G05F 1/66* (2013.01); *G05B 13/026* (2013.01); *G05B 15/02* (2013.01);
(Continued)

(58) Field of Classification Search
CPC ......... G05F 1/66; G05B 15/02; G05B 13/026; G05B 2219/2642; G05B 2219/2639; G06Q 50/06
See application file for complete search history.

(56) References Cited

U.S. PATENT DOCUMENTS

| 4,858,141 A | 8/1989 | Hart et al. |
| 8,024,073 B2 | 9/2011 | Imes et al. |

(Continued)

FOREIGN PATENT DOCUMENTS

| CA | 2753809 A1 | 3/2013 |
| CA | 2864739 A1 | 6/2013 |

(Continued)

OTHER PUBLICATIONS

International Research Report completed Oct. 28, 2015; 2 pages.
(Continued)

*Primary Examiner* — James J Lee
*Assistant Examiner* — Shon G Foley
(74) *Attorney, Agent, or Firm* — Landmark Intellectual Property Law, PLLC; Gregory Murphy

(57) ABSTRACT

The present invention is generally directed to systems and methods for optimizing energy usage in a household. For example, methods for optimizing energy usage in a household may include steps of: receiving, using an energy optimization device, entire energy profile data associated with the household; obtaining, using the energy optimization device, time of use (TOU) energy pricing structure; processing, the entire energy profile data to generate disaggregated appliance level data related to one or more appliances used in the household; retrieving historical patterns of energy usage of the household during both peak and non-peak time periods; applying a behavior shift analysis on the disaggregated data based at least in part on the TOU energy pricing structure, disaggregated data, and historical patterns of the energy usage; and predicting potential energy savings based at least in part on the behavior shift analysis.

13 Claims, 5 Drawing Sheets

(51) Int. Cl.
*G05B 15/02* (2006.01)
*G06Q 50/06* (2012.01)
(52) U.S. Cl.
CPC .............. *G05B 2219/2639* (2013.01); *G05B 2219/2642* (2013.01); *G06Q 50/06* (2013.01)

(56) References Cited

U.S. PATENT DOCUMENTS

| | | | |
|---|---|---|---|
| 8,447,541 B2 | 5/2013 | Rada et al. | |
| 8,719,186 B2 | 5/2014 | Amram et al. | |
| 9,275,065 B1 | 3/2016 | Ganesh et al. | |
| 10,114,347 B2 | 10/2018 | Gupta et al. | |
| 10,175,276 B2 | 1/2019 | Fishburn et al. | |
| 2003/0229572 A1 | 12/2003 | Raines et al. | |
| 2004/0204193 A1 | 10/2004 | Li et al. | |
| 2005/0065893 A1 | 3/2005 | Josephson | |
| 2005/0116836 A1 | 6/2005 | Perry et al. | |
| 2006/0161450 A1 | 7/2006 | Carey et al. | |
| 2007/0123166 A1 | 5/2007 | Sheynman et al. | |
| 2008/0281473 A1 | 11/2008 | Pitt | |
| 2009/0045804 A1 | 2/2009 | Durling et al. | |
| 2009/0093916 A1 | 4/2009 | Parsonnet et al. | |
| 2009/0195349 A1 | 8/2009 | Frader-Thompson et al. | |
| 2009/0204368 A1 | 8/2009 | Bickel | |
| 2010/0064001 A1 | 3/2010 | Daily | |
| 2010/0076615 A1 | 3/2010 | Daniel et al. | |
| 2010/0305889 A1 | 12/2010 | Tomlinson, Jr. et al. | |
| 2011/0046805 A1* | 2/2011 | Bedros | H04L 12/2809 700/291 |
| 2011/0046806 A1 | 2/2011 | Nagel et al. | |
| 2011/0046904 A1 | 2/2011 | Souilmi | |
| 2011/0082599 A1 | 4/2011 | Shinde et al. | |
| 2011/0144819 A1 | 6/2011 | Andrews et al. | |
| 2011/0161251 A1 | 6/2011 | Carey et al. | |
| 2011/0251807 A1 | 10/2011 | Rada et al. | |
| 2011/0277471 A1 | 11/2011 | Shinnar | |
| 2011/0304876 A1* | 12/2011 | Coffey | G03G 15/5004 358/1.15 |
| 2012/0053740 A1 | 3/2012 | Venkatakrishnan et al. | |
| 2012/0101653 A1 | 4/2012 | Tran | |
| 2012/0131324 A1 | 5/2012 | Ansari et al. | |
| 2012/0166115 A1 | 6/2012 | Apostolakis | |
| 2012/0246040 A1 | 9/2012 | Littrell | |
| 2012/0290230 A1* | 11/2012 | Berges Gonzalez | G01D 4/004 702/61 |
| 2012/0296799 A1 | 11/2012 | Playfair et al. | |
| 2013/0066479 A1 | 3/2013 | Shetty et al. | |
| 2013/0103215 A1 | 4/2013 | Dai et al. | |
| 2013/0103656 A1 | 4/2013 | Loureda et al. | |
| 2013/0110621 A1 | 5/2013 | Gupta et al. | |
| 2013/0144451 A1 | 6/2013 | Kumar et al. | |
| 2013/0289788 A1 | 10/2013 | Gupta et al. | |
| 2013/0307702 A1 | 11/2013 | Pal et al. | |
| 2013/0338948 A1 | 12/2013 | Zeifman | |
| 2014/0039965 A1* | 2/2014 | Steven | G06Q 10/06315 705/7.25 |
| 2014/0129040 A1 | 5/2014 | Emadi et al. | |
| 2014/0129160 A1 | 5/2014 | Tran | |
| 2014/0142724 A1 | 5/2014 | Park et al. | |
| 2014/0149056 A1 | 5/2014 | Lelkens et al. | |
| 2014/0200725 A1 | 7/2014 | Dillen | |
| 2014/0207298 A1 | 7/2014 | Gupta et al. | |
| 2014/0229405 A1 | 8/2014 | Govrin et al. | |
| 2014/0244057 A1 | 8/2014 | Hamouz et al. | |
| 2014/0324240 A1 | 10/2014 | Thottan et al. | |
| 2015/0012147 A1 | 1/2015 | Haghighat-Kashani et al. | |
| 2015/0039149 A1 | 2/2015 | Forbes, Jr. | |
| 2015/0137792 A1 | 5/2015 | Filippi et al. | |
| 2015/0142195 A1* | 5/2015 | Hoppe | G05B 13/02 700/291 |
| 2015/0142347 A1 | 5/2015 | Mohan et al. | |
| 2015/0142695 A1 | 5/2015 | He et al. | |
| 2015/0160099 A1 | 6/2015 | Hamouz et al. | |
| 2015/0215700 A1 | 7/2015 | Sun et al. | |
| 2015/0268281 A1 | 9/2015 | Haghighat-Kashani | |
| 2015/0276828 A1 | 10/2015 | Filippi et al. | |
| 2016/0005015 A1 | 1/2016 | Curtis | |
| 2016/0018835 A1 | 1/2016 | Gaasch et al. | |
| 2016/0070285 A1 | 3/2016 | Gupta et al. | |
| 2016/0070286 A1 | 3/2016 | Gupta et al. | |
| 2016/0238640 A1 | 8/2016 | Maasoumy et al. | |
| 2017/0176967 A1 | 6/2017 | Takada et al. | |
| 2017/0315855 A1 | 11/2017 | Doblander et al. | |
| 2018/0032758 A1 | 2/2018 | Wang et al. | |
| 2018/0364666 A1 | 12/2018 | Haghighat-Kashani et al. | |
| 2019/0050430 A1 | 2/2019 | Gupta et al. | |

FOREIGN PATENT DOCUMENTS

| | | | |
|---|---|---|---|
| CA | 2864758 A1 | 8/2013 | |
| CN | 102280935 A | 12/2011 | |
| CN | 103280840 A * | 9/2013 | ............... H02J 3/38 |
| WO | 2011130670 A3 | 12/2011 | |

OTHER PUBLICATIONS

Akbari, H.: "Validation of an algorithm to disaggregate whole-building hourly electrical load into end uses", Energy, vol. 20, Issue 12, 1995, pp. 1291-1301.

Andrea Spikes, "Smart Meters and a Smarter Grid", (May 16, 2011), U.S. Department of Energy. (Year: 2011).

Batra et al. "Neighbourhood NILM: A Big-data Approach to Household Energy Disaggregation" In: Cornell University Library/Computer Science/Machine Learning, Oct. 26, 2015 [online][retrieved on Aug. 9, 2018 (Aug. 9, 2018)] Retrieved from the Internet, entire document, especially Abstract; p. 4, col. 1-2.

Carrie Armel, "Energy Disaggregation", (Dec. 2011), Precourt Energy Efficiency Center, Stanford. (Year: 2011).

Cetin et al. "Disaggregation and Future Prediction of Monthly Residential Building Energy Use Data Using Localized Weather Data Network." In: ACEEE Summer Study on Energy Efficiency in Buildings, Aug. 21-26, 2016 [online] [retrieved on Aug. 9, 2018 (Aug. 9, 2018)] Retrieved from the Internet , entire document, especially Abstract; pp. 4-8.

Feinberg, E.A. et al.: "Load Forecasting", Chapter 12, State University of New York, Stony Brook, Aug. 29, 2004.

GB 2502062 A (Toshiba Research Europe Limited) Nov. 20, 2013 (Nov. 20, 2013) entire document (especially Abstract, Figs. 1, 2, 3a, 5-7, col. 2, line 17-col. 3, line 9, col. 3 lines 16-20, col. 5, lines 16-19, col. 8, lines 1-9, col. 14, lines 31-35, col. 18, lines 14-29, col. 18, line 33-col. 19, line 5).

Hart 'Nonintrusive Appliance Load Monitoring' Proceedings of the IEEE, vol. 80, No. 12, pp. 1870-1891, Dec. 1992.

Ruzzelli et al. 'Real-Time Recongnition and Profiling of Appliances through a Single Electricity Sensor' 2010 7th Annual IEEE Communications Society Conference on Sensor, Mesh and Ad Hoc Communications and Networks (SECON), Boston, MA, 2010, pp. 1-9.

Zhang, Residential Electric Load Disaggregation for Low-Frequency Utility Applications, 2015, IEEE, pp. 5 (Year: 2015).

Zoha, Non-Intrusive Load Monitoring Approaches for Disaggregated Energy Sensing: A Survey, Sensors, pp. 29 (Year: 2012).

International Search Report for PCT/US2018/036012 completed Jul. 25, 2013; 2 pages.

International Search Report for PCT/US2018/018410 completed Apr. 26, 2018; 2 pages.

International Search Report for PCT/US2018/036012 completed Aug. 10, 2018; 2 pages.

Writtin Opinion of the International Search Report for PCT/US2018/036012 dated Aug. 31, 2018; 31 pages.

Written Opinion of the International Search Report for PCT/US2013/038268 dated Jul. 30, 2018; 7 pages.

Written Opinin of the International Search Report for PCT/US2018/018410 dated May 30, 2018; 5 pages.

* cited by examiner

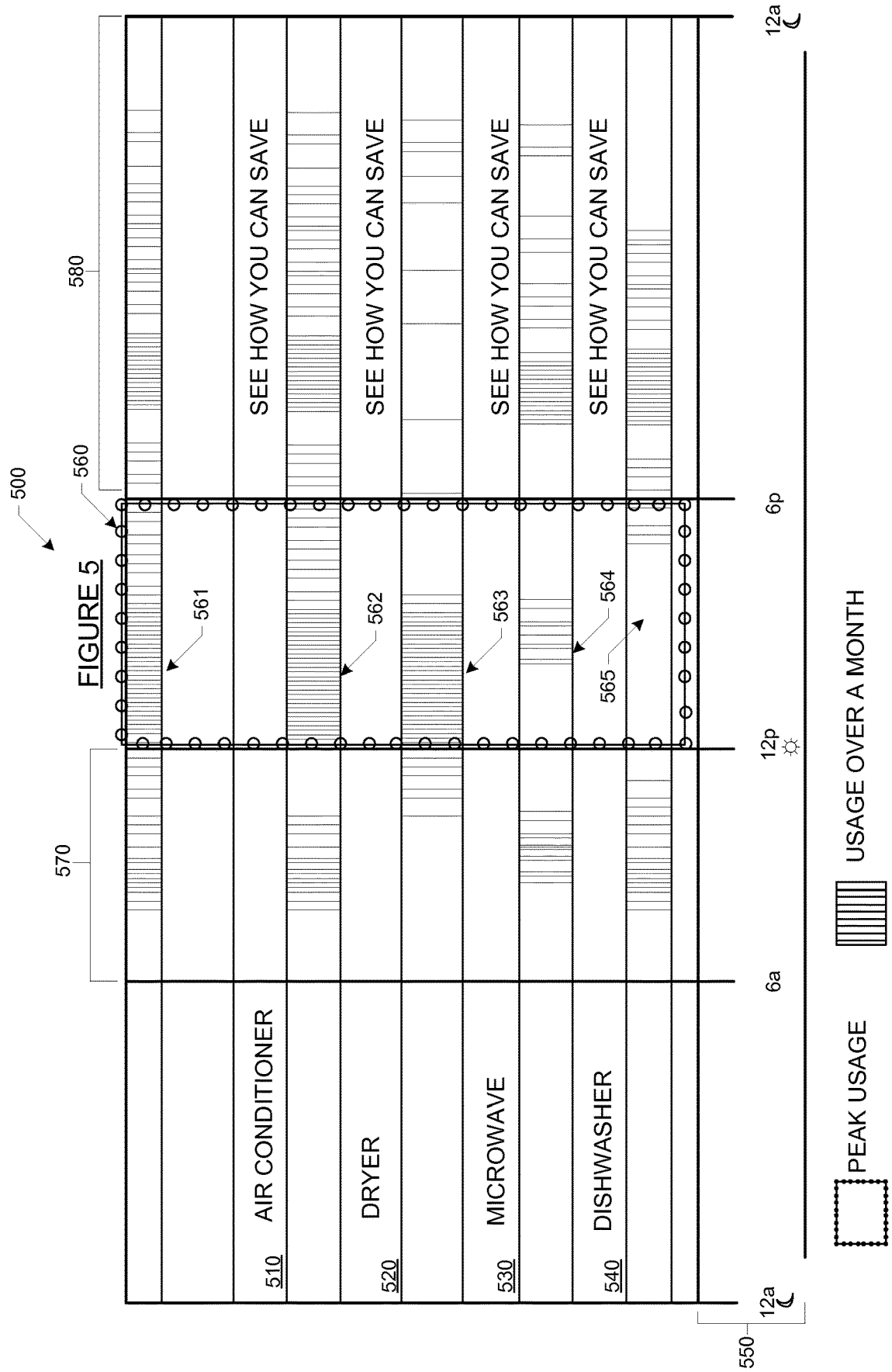

SYSTEMS AND METHODS FOR OPTIMIZING ENERGY USAGE USING ENERGY DISAGGREGATION DATA AND TIME OF USE INFORMATION

RELATED APPLICATIONS

This application claims the benefit of U.S. Provisional Application Ser. No. 62/045,679, filed on Sep. 4, 2014, which is incorporated herein by reference in its entirety.

BACKGROUND

Time of use (TOU) energy pricing is a pricing scheme under which a price of energy depends on when it is being used. For example, during "peak" hours when energy suppliers typically see a very high demand for electricity, the price of energy may be significantly higher than during non-peak hours. Unfortunately, customers generally have little visibility into how much energy individual devices actually consume, and even less information tying such information to real time TOU energy prices.

In view of the above, there is a need to provide users with a mechanism so that users can be informed of the impact of TOU energy pricing.

Further, Non-Intrusive Load Monitoring (NILM) (also known as energy disaggregation) has been a topic of research for over 20 years. NILM enables the breakdown of electricity usage for a household without entering the premises or applying sub-metering devices on individual appliances/devices/loads inside the premises. A basic NILM process may involve generating and using appliance load signatures to extract energy consumption of individual from the whole house load profile data. A common application of energy disaggregation is making users aware of their energy spending breakdown and identifying appliance specific inefficiencies.

Accordingly, there is a need to utilize NILM or energy disaggregation results coupled with TOU information and tracking in order to provide users with information such that users may make educated decisions in what appliances to use, and when.

SUMMARY

The present subject matter described herein, in general, relates to energy optimization, and more particularly but not exclusively, to methods and devices for optimizing energy usage data using energy disaggregation data and time of use information.

Disclosed herein is a method for optimizing energy usage in a household. Methods in accordance with some embodiments of the present invention may comprise receiving, using an energy optimization device, entire energy profile data associated with the household; obtaining, using the energy optimization device, time of use (TOU) energy pricing structure; processing, using the energy optimization device, the entire energy profile data to generate disaggregated appliance level data related to one or more appliances used in the household; retrieving, using the energy optimization device, historical patterns of energy usage of the household during both peak and non-peak time periods; applying a behavior shift analysis on the disaggregated data based at least in part on the TOU energy pricing structure, disaggregated data, and historical patterns of the energy usage; and predicting potential energy savings based at least in part on the behavior shift analysis.

In accordance with some embodiments of the present invention, other aspects may include a device for optimizing energy usage comprising: one or more hardware processors; a memory coupled to the one or more hardware processors storing instructions, that when executed by the one or more hardware processors, causes the one or more hardware processors to perform operations comprising: receiving entire energy profile data associated with the household, obtaining time of use (TOU) energy pricing structure; processing, using the energy optimization device, the entire energy profile data to generate disaggregated appliance level data related to one or more appliances used in the household; retrieving historical patterns of energy usage of the household during peak and non-peak time periods; applying a behavior shift analysis on the disaggregated data based at least in part on the TOU energy pricing structure, disaggregated data, and historical patterns of the energy usage; and predicting potential energy savings based at least in part on the behavior shift analysis.

In accordance with some embodiments of the present invention, other aspects may be directed to a non-transitory computer readable medium storing instructions for optimizing energy usage in at least one household, that when executed by the one or more hardware processors, causes the one or more hardware processors to perform operations comprising: receiving, using an energy optimization device, entire energy profile data associated with the household; obtaining, using the energy optimization device, time of use (TOU) energy pricing structure; processing, using the energy optimization device, the entire energy profile data to generate disaggregated appliance level data related to one or more appliances used in the household; retrieving, using the energy optimization device, historical patterns of energy usage of the household during both peak and non-peak time periods; applying a behavior shift analysis on the disaggregated data based at least in part on the TOU energy pricing structure, disaggregated data, and historical patterns of the energy usage; and predicting potential energy savings based at least in part on the behavior shift analysis.

The foregoing summary is only illustrative in nature and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 5 illustrates an exemplary format of information displaying appliances used during peak times, and the increased cost based upon the timing of such use, in accordance with some embodiments of the present invention.

DETAILED DESCRIPTION

Figure 1:
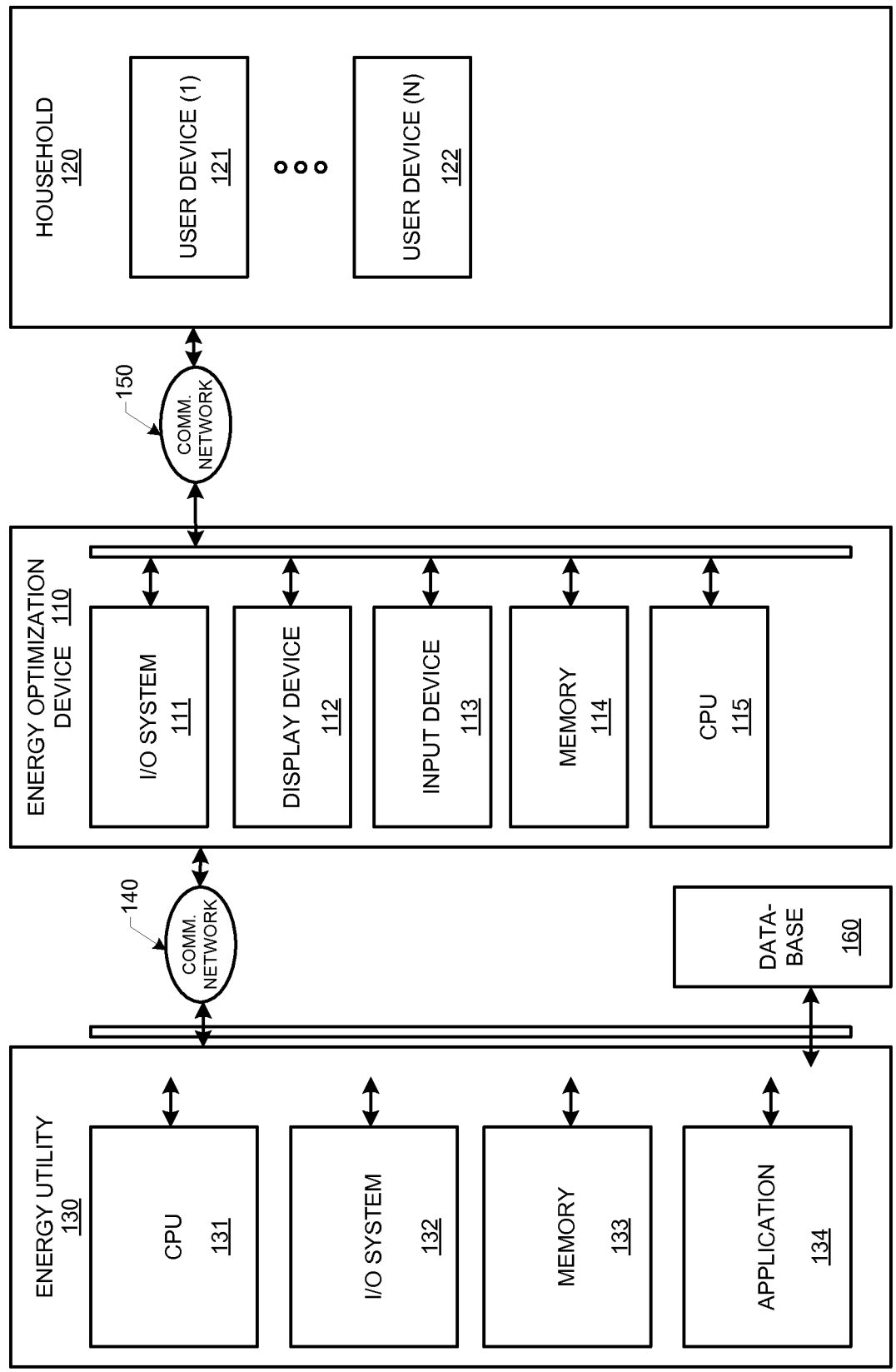
FIG. 1 depicts an exemplary environment that comprises an energy optimization device for optimizing energy usage in accordance with some embodiments of the present invention.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Some embodiments of the present invention are directed to methods, computer readable media, and/or devices that may optimize energy usage in a household. Entire energy profile data associated with the household is received. Further, time of use (TOU) energy pricing structure from an energy utility is received. The time of use energy pricing structure may include rate structure for peak time period, non-peak time period, Critical Peak Pricing (CPP) or Peak Time Rebate (PTR). Further the entire energy profile data is processed to generate disaggregated data regarding the energy usage associated with one or more appliances being used in the household. Subsequently, historical patterns of energy usage of a user in the peak time periods and non-peak time periods are retrieved. Further, time of use behavior shift analysis is applied on the disaggregated data based at least on the TOU pricing structure, disaggregated data, and historical patterns of the energy usage in the peak and non-peak time periods to predict potential energy saving.

As discussed above, users may obtain cost savings by shifting the time of use of energy usage, for example within a day or even a \billing cycle. Moreover, users may additionally save energy and/or cost associated therewith by knowing how much energy individual device or appliance consumes and/or costs. This may allow the energy users to modify or alter behavior patterns in order to use specific devices during varying times of the day, thereby creating cost savings based on time of use energy usage. The present disclosure describes a method for enabling energy savings using TOU and individual appliance information This technology may provide a number of advantages, such as but not limited to providing effective methods, non-transitory computer readable media, and devices for optimizing energy usage in a household. The technology may facilitate optimizing energy usage in a household using energy disaggregation data and TOU information. In addition, utilities may utilize some embodiments of the present invention in order to provide more efficient power provision, for example by shifting user's energy load from peak times to off peak times, thereby reducing peak demand required by the utility, and potentially avoiding the need for additional power plants Furthermore, the technology may facilitate analyzing household load profile data not only at an aggregated level for their entire service territory, but at an appliance specific level, in order to enable educated decisions on what programs to offer or run to reduce peak demand. Energy demand may be better forecasted to more accurately manage future purchase of energy. Accordingly, utilities may be able to avoid running short of supply during peak times or having an unnecessary and inefficient surplus.

Moreover, if a user has a home equipped with solar panels for generating energy, the appliance usage of such user may be aligned with the solar generation in order to inform the user as to optimal times to use appliances, based on solar generation and/or TOU rates. Solar generation and TOU rates are two factors that may assist in defining an overall cost of energy for a user at any given time. For example, if during peak hours (for an applicable TOU rate) local solar panels are producing 5 kW of energy, and the user is using less than 5 kW, applicable TOU rates may be inapplicable. However, if the user is using more than 5 kW, peak rates (under the TOU plan) may apply. Accordingly, in order to determine how to inform a user of the implications of a TOU plan on energy usage, factors such as local solar generation may be considered.

In addition, some users may be equipped with energy storage systems, which coupled with applicable TOU rates and any applicable solar generation), may provide another factor to consider. In such circumstances, some embodiments of the present invention may utilize information at the appliance level in order to determine what maximum load a user may use to avoid paying peak rates. Using such information, very specific recommendations may be made, for example noting that cooking stove use is acceptable, but a clothes dryer will incur peak rates during certain hours.

Some embodiments of the present invention may also provide real time optimization of energy usage. For example, if certain conditions are met (for example, using more power than is available through solar and any energy storage system), a user may be alerted in order to cause behavior modifications. In other words, in accordance with some embodiments of the present invention the system may be proactive rather than merely reactive. For example, a user may start charging an electric vehicle during peak hours. Systems in accordance with some embodiments of the present invention may determine in real time or near real time that energy usage of the whole house has increased and alert the user. In some circumstances, the system may determine what appliance or device was turned on—for example an electric vehicle charger—and warn the user that peak rates under the TOU plan apply, and recommend that the appliance or device be used during off peak hours.

Devices and methods in accordance with some embodiments of the present disclosure may identify and monitor component energy signals within a whole house energy profile. Historical, real time, and/or future energy savings may then be calculated for the whole house and/or per appliance based on TOU pricing information, which may be collected from an energy supplier, utility, or a party associated therewith.

Referring to FIG. 1, in accordance with some embodiments of the present invention, an exemplary environment 100 for optimizing the energy usage in a household will be discussed. In general, exemplary environment 100 may comprise an energy optimization device 110 in communication with a specific household 120 and an energy utility 130. The energy optimization device may communicate with the specific household 120 and/or the energy utility 130 via one or more communication networks 140, 150. Note that it is also contemplated that the energy optimization device 110 may interact with the user devices 121, 122 in the specific household 120 using other methods or techniques. For example, it is contemplated that the energy optimization device 110 may interact with the user devices 121, 122 and a home area network (HAN) (not illustrated) within the specific household 120. Communication networks 140, 150 may include the internet, local area networks (LAN), wide area network (WAN), virtual private networks (VPN), 3G technologies, GPRS, and/or EDGE technologies, although the communication networks 140, 150 may comprise other types and numbers of networks and topologies.

Note that while not shown, the exemplary environment 100 may include additional components, such as but not limited to routers, switches and other devices which are well known to those of ordinary skill in the art and thus will not be described here.

In general, energy optimization device 110 may facilitate energy optimization within environment 100 as illustrated and described with the examples herein, although the energy optimization device 110 may also perform other types and numbers of functions and operate in other types of networks.

Energy optimization device 110 may comprise various components. Such components may include some or all of: an input/output (I/O) system 111, a display device 112, an input device 113, a memory 114, and/or a central processing unit (CPU) 115. Such components may be connected or in communication with each other through a bus 116. Although it is contemplated that bus 116 may comprise a hypertransport bus, other bus types and/or links may be used, such as but not limited to a PCI (peripheral component interconnect) system. Note that the energy optimization device 110 may also comprise other types and numbers of elements in various configurations. Each component is discussed below.

The I/O system 111 in the energy optimization device 110 may be used to operatively couple and communicate between the energy optimization device 110 and the user devices 121, 122, which may be coupled together or in selective communication via communication network 150. The I/O system 111 may work in connection with display device 112 and input device 113 to provide for user interaction with the energy optimization device 110.

The display device 112 may enable a user to interact with the energy optimization device 110, such as to view information, input information, configure the device, program the device, and/or operate the device. By way of example only, the display device 112 may include one or more of a CRT, LED monitor, LCD monitor, or touch screen display technology although other types and numbers of display devices may be used.

Energy optimization device 110 may also include an input device 113 that may, for example, enable a user, to interact with energy optimization device 110, such as to input data, view data, configure the device, program the device, and/or operate the device. By way of example only, input device 113 may include one or more of a touch screen, keyboard and/or a computer mouse.

The memory 114 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. In accordance with some embodiments of the present invention, memory 114 may store one or more programmed instructions such that the CPU 115 may execute the program, processes and/or methods. For example, exemplary flow charts shown in FIG. 2 and/or FIG. 3 may be representative of steps or actions of this technology that may be embodied or expressed as one or more non-transitory computer or machine readable having stored instructions stored in memory 114.

CPU 115 may comprise one or more one or more processing cores, such as AMD® or Intel® processors, and may be configured to execute one or more computer-executable instructions stored in a memory 114, although it is contemplated that the CPU 116 may also execute other types and numbers of instructions and perform other types and numbers of operations.

The exemplary environment 100 may further comprise a specific household 120, which may include or comprise a plurality of user devices 121, 122, disposed in a household 120. Energy optimization device 110 and the user devices 121, 122 within a specific household 120 may be in selective communication via communication network 150. Note that the specific household 120 may be include solar generation devices or an energy storage system. Energy input from the solar generation device or energy drawn from an energy storage system must be considered when performing appliance level disaggregation, and further may be considered when determining various TOU determinations as discussed below.

Energy utility 130 may be in selective communication with energy optimization device 110 via communication network 140. Communication network 140 may comprise any sort of network or connection, similar to as discussed above with regard to communication network 150. Energy utility 130 may include a central processing unit (CPU) or processor 131, an input/output (I/O) system 132, a memory 133, and an application that may operate as an interface system 134. Such components may be coupled together by a bus or other link, although other numbers and types of network devices could be used.

Energy utility 130 may also further comprise, or have access to, database 160. Database 160 may comprise one or more data stores, and may comprise information such as, but not limited to, TOU pricing structures for specific users, entire energy profiles of a user (i.e., aggregated data), which may be received, for example, from a Smart Meter, disaggregated data, and/or historical patterns of energy use for specific users.

Note that it is contemplated that in accordance with some embodiments of the present invention, the energy optimization device may be disposed at the energy utility 130.

Although the exemplary environment 100 includes energy optimization device 110, a specific household 120 with multiple user devices 121, 122, , , and energy utility 130 as described and illustrated herein, other types and numbers of systems, devices in other topologies may be used. It is to be understood that the systems of the examples described herein are for exemplary purposes, as many variations of the specific hardware and software used to implement the examples are possible, as will be appreciated by those skilled in the relevant art(s).

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
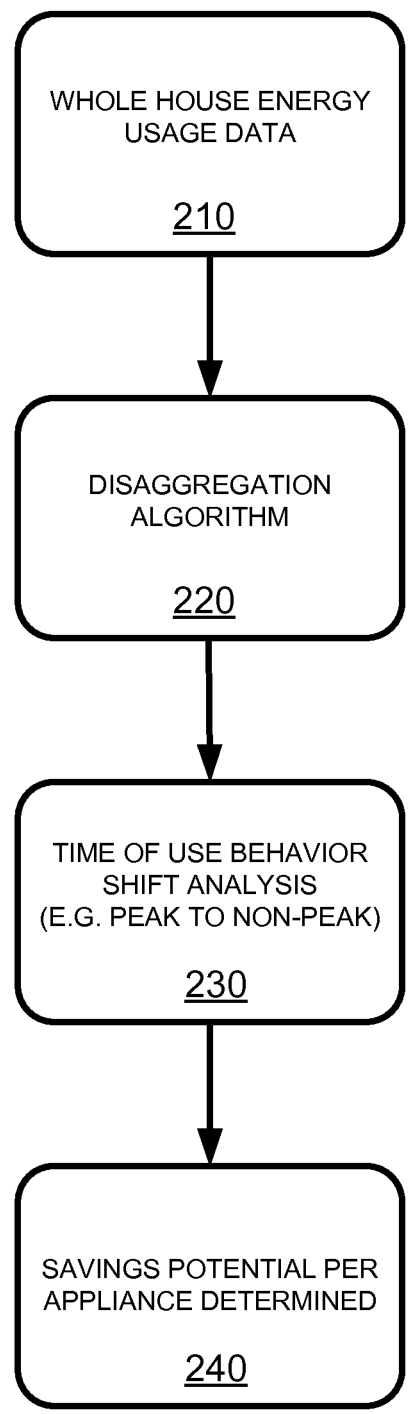
FIG. 2 illustrates a flowchart of an exemplary method for optimizing energy usage in a household in accordance with some embodiments of the present invention.

With reference to FIG. 2, a general, exemplary, and over-simplified flow in accordance with some embodiments of the present invention will now be discussed. At 210, a whole-house energy profile may be obtained. This may be obtained from a utility, from a Smart Meter, GreenButton information, or from a local device such as a home area network device, CT clamp, IR sensor, etc. At 220, a disaggregation algorithm or process may be applied to the data, which may result in identifying specific appliance energy usage.

At 230, a time of use behavior shift analysis may be applied to the disaggregated data. In other words, at 230 it may be determined what cost and/or energy savings may be achieved by modifying the behavior of a customer. As noted above, such determination may be based at least in part upon TOU rate schedules from the applicable utility. For example, at 230 it may be determined that a customer used laundry appliances between 6:00 pm and 7:59 pm (peak hours), but does not utilize laundry appliances after 8:00 pm (non-peak hours).

At 240 savings potential per appliance may be determined. For example, the system may determine that if a specific customer utilized his or her laundry appliances after 8:00 pm (rather than between 6:00 and 7:59 pm), the customer may save a certain amount in energy costs.

By providing the customer with appliance level savings potential, the customer may determine what behavior modifications are worthwhile to the individual customer. For example, a customer may decide to continue utilizing laundry during peak hours (for example, perhaps the customer has young children in the house and wishes to complete laundry by bed time), but may be willing to program the pool pump/filter to only run during non-peak hours.

Figure 3:
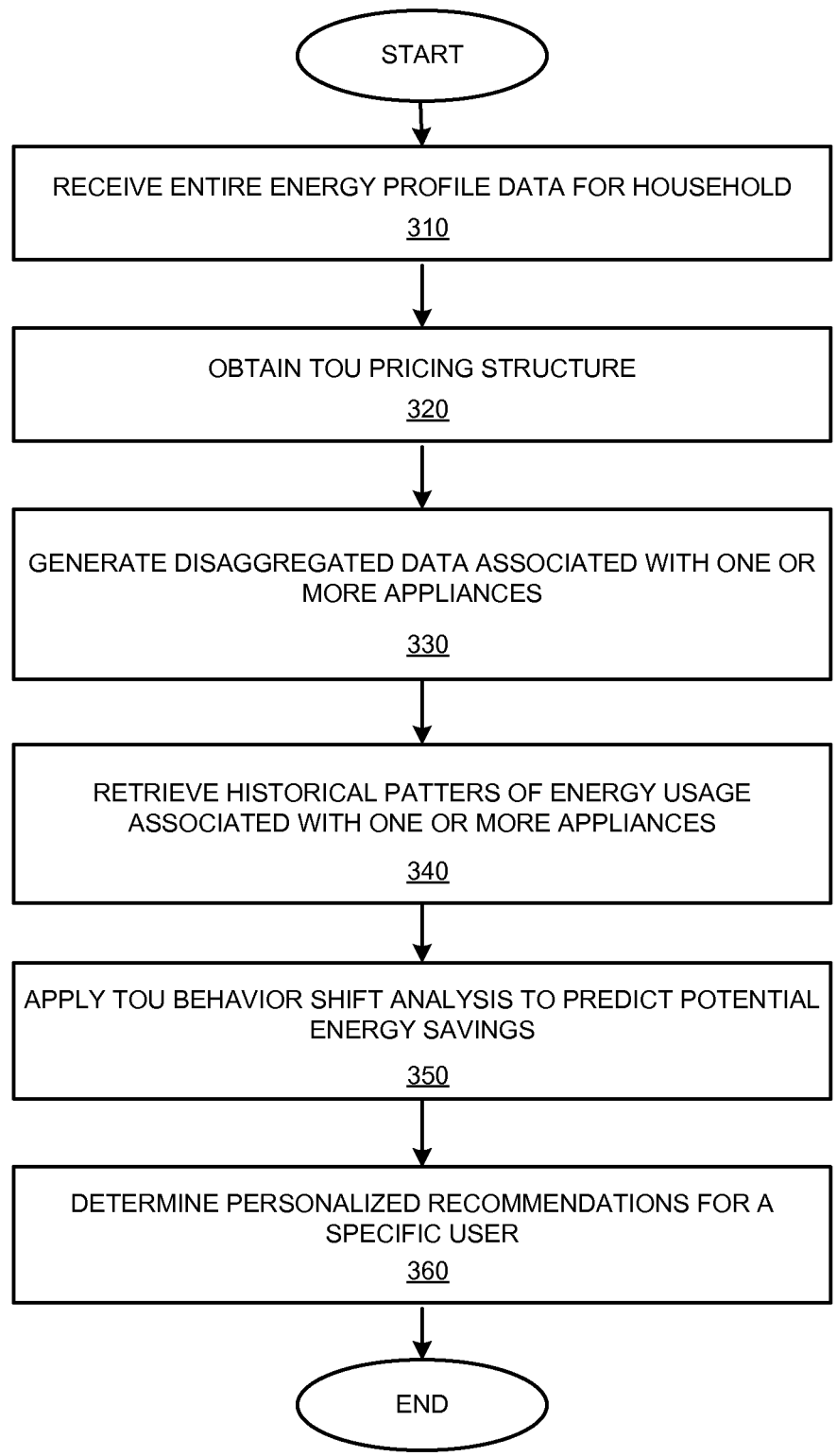
FIG. 3 illustrates a flowchart of an exemplary method for optimizing energy usage in a household in accordance with some embodiments of the present invention.

With reference to FIG. 3, an exemplary method 300 for facilitating energy optimization in a specific household will now be described. Note that the order of the steps illustrated is exemplary and not to be construed as limiting.

At 310 an energy optimization device may receive an entire energy profile data associated with a specific household. Such entire energy profile data may be received from a variety of sources, including but not limited a database associated or maintained by a utility, a third party monitoring such usage, data retrieved from a Smart Meter or Green Button, a home area network (HAN), or from measuring device (such as a CT clamp, IR sensor, etc.).

The entire energy profile data may be an aggregated energy profile data of various appliances used in a specific household. For example, such appliances may include, but are not limited to, an air conditioner, refrigerator, dish washer, and/or dryer.

Note that the energy profile data of such various appliances may vary during hours of the day, including throughout both peak and non-peak hours. By way of example only, from 3 pm to 6 pm, which is non peak period, the energy consumption of an air conditioner may be lower than the energy consumption of the air conditioner during 6-9 pm, which may be a peak period. Accordingly, there may be different energy pricing structures during peak and non-peak periods. The energy pricing structure during the peak period would be higher than the energy pricing structure during the non-peak period.

At step 320, an energy optimization device may obtain time of use (TOU) energy pricing structure. This information may be obtained from an energy utility, or from a third party. TOU energy pricing structure may, for example, include rate structure for peak time period and non-peak time period. TOU pricing structures may be applicable through a calendar year—that is, such rates may be seen as perpetual and may lead to a permanent shift in a user's behavior. However, it is contemplated that TOU energy pricing structure may include items such as Critical Peak Pricing (CPP) or Peak Time Rebate (PTR). These are two other types or rate plans may be used by utilities where CPP puts penalty of higher price being used and PTR is the incentive given if a user reduces the peak time usage. These may be associated during periods termed "peak events" by the utility, which generally occur about 10-20 times a year, for approximately 3-5 hours a day. PTR and CPP are temporary actions to be taken by user for specific days.

The TOU energy pricing structure may be stored in a database, or may be obtained from a smart meter or other device. Alternatively, TOU energy pricing structures may be retrieved via an API directly from the energy utility or from by scraping a utility's web site.

At step 330, the entire energy profile data may be processed (for example, using an energy optimization device) in order to generate disaggregated data. Such data may specify the energy usage associated with one or more appliances being used in the specific household. A disaggregation algorithm may be applied to the entire energy profile data that may result in identifying energy profile data associated with the one or more appliances.

In some embodiments of the present disclosure, a historical pattern of energy use of a specific household may utilized. Such historical patterns may be saved by or associated with an energy utility, a third party database, and/or by an energy optimization device. In accordance with some embodiments of the present invention, an energy optimization device may obtain past usage information and identify or determine historical, repeatable patterns of the energy usage. In addition, a historical TOU rate structure may be obtained and compared it existing rate structures.

At step 340, such historical patterns of energy usage may be retrieved or determined. Such patterns may be determined on an appliance level, that is associated with one or more appliances in the peak time periods and non-peak time periods. Based at least in part on the historical patterns of the energy usage, future costs associated the use of one or more specific appliances during specific times of use may be predicted.

At step 350, a behavior shift analysis may be applied on the disaggregated data. Such analysis may be based at least in part on the TOU pricing structure, disaggregated energy data, and historical patterns of the energy usage during peak and non-peak time periods. Such analysis may assist in predicting potential energy saving. In other words, it may be determined what cost and/or energy savings may be achieved by modifying the behavior of the user. Moreover, historical patterns of the energy usage may include real time or near real time patterns of energy usage.

Accordingly, if the user is using an air conditioner during a peak period, the user may be advised to use the AC during non-peak period. Similarly, it may be determined that a user uses laundry appliances between 6 pm and 7:59 pm (peak hours), but does not utilize laundry appliances after 8 pm (non-peak hours). Savings potential per appliance may be determined. For example, it may be determined that if the user utilized his or her laundry appliances after 8 pm (rather than between 6 pm and 7:59 pm), the customer may save a certain amount.

In some embodiments, an energy utility may apply the time of use behavior shift analysis on the disaggregated data based at least on the TOU pricing structure, disaggregated energy data, and historical patterns of the energy usage in the peak and non-peak time periods to predict potential energy saving An energy optimization device may determine appliance level usage by disaggregating individual appliance signatures. The device may then compare several theoretical scenarios in which this usage is "shifted" to different times of the day (i.e. to different rates under the particular energy utility's rate structure, which for example, may have been previously pulled from a utility's database).

The energy optimization device may then project and compare the difference in energy costs to the energy consumer based on several different TOU situations for the one or more appliances. The device may then, based at least in part upon an analysis of that energy user's personal energy usage habits, present the most relevant recommendations to the user. Such personal energy usage habits that may be considered may include, but are not limited to, when the user is typically home during early afternoons, and may therefore recommend shifting laundry usage from evening to early afternoon). Potential savings in dollars or kWh may be displayed if a certain appliance or group of appliances were shifted from being used during peak to during non-peak hours. For example, a user may be informed that using a dryer from 10 am-11 am may save $4/month instead of using it from 3 pm-7 pm. Similarly, a heat map of when an appliance or group of appliances are being used throughout the day may be displayed, highlighting peak and non-peak hours.

In general, at step 360, based on the applied time of use behavior shift analysis on the disaggregated data, an energy optimization device may determine or identify personalized recommendations for a specific user dependent on the specific user's appliance level energy profile to save energy, switch rate plans, change behavior etc. Such recommendations may be uniquely tailored to each user and may depend upon processing of the disaggregated data. In some embodiments, an energy utility may determine or identify personalized recommendations for a specific user dependent on the specific user's appliance level energy profile to save energy, switch rate plans, change behavior etc. Such recommendations may be based on the applied time of use behavior shift analysis on the disaggregated data, Moreover, devices and methods in accordance with some embodiments of the present disclosure may display a cost comparison of appliance-level usage under TOU rates and non-TOU rate schedules on the display devices. This may be useful for users trying to predict energy bills under a multitude of competing energy supplier rate structures or different rate structures from the same supplier. In addition, based at least in part upon such information, an alert may be sent to the user when peak-pricing times occur and the system detects individual appliance usage (for example, notifying the energy user that if the user delays running laundry for twenty minutes, a certain cost savings may be achieved. Similarly, a customer may query the device asking the best times to use certain appliances and the projected energy savings that would result.

Such personal recommendations may be provided to the user on a user device. By providing the user with appliance level recommendations, the user may determine what behavior modifications may be worthwhile to the individual user. For example, the user may the user may decide to continue utilizing laundry during peak hours (for example, perhaps the user has young children in the house and wishes to complete laundry by bed time), but may be willing to program the pool pump/filter to only run during non-peak hours.

Figure 4:
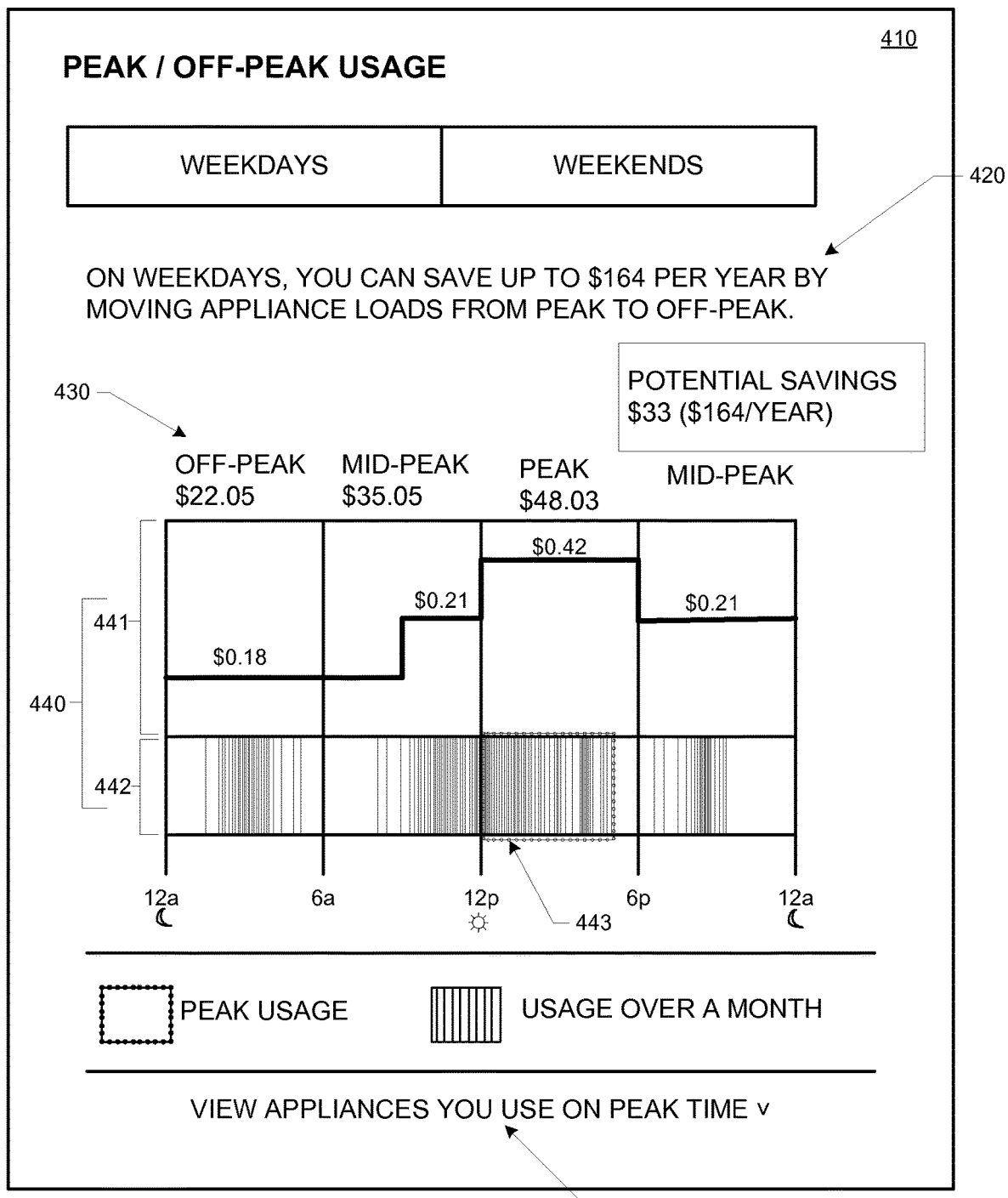
FIG. 4 depicts a graphical representation of exemplary information determined from devices and methods in accordance with some embodiments of the present invention.

Referring to FIG. 4, a graphical representation 410 of information determined from devices and method in accordance with some embodiments of the present disclosure may be explained. For example, a user may be informed at 420 that "On weekdays, you can save up to $164 per year by moving appliance loads from peak to off-peak." Such statements may be supported by illustrating to the user at 430 the off peak, mid peak, and peak usage of such appliance loads. Moreover, the graphical representation 410 may also illustrate the TOU rate structure for the energy user compared with the user's specific energy usage at 440.

For example, at 441 it can be seen that energy costs $0.18/unit between 12:00 AM and 9:00 AM, $0.21/unit between 9:00 AM and 12:00 PM, $0.42/unit between 12:00 PM and 5:30 PM, and $0.21/unit from 5:30 PM to 12:00 AM. At 442, a heat map of the actual usage may be presented to the user. From such information, a user may quickly see at 443 that during peak hours there was significant energy usage.

Should a user desire to see a specific breakdown of appliance usage as compared with TOU rates, a user may select so at 450. With reference to FIG. 5 such specific appliance usage may be seen at 500.

In accordance with some embodiments of the present invention, energy optimization devices may also provide information such as displaying to the customer appliances that were used during peak times, and the increased cost based upon the timing of such use. Such information may be presented in any number of formats, including but not limited to the graphic illustrated by FIG. 5. FIG. 5 sets forth some main appliances (particularly those that have a significant energy draw), and illustrates when such appliances were used during the time of day. This information can be overlaid with the TOU rate structure of the utility, thereby showing the energy user how much the specific timing of his or her appliance use costs (or saves) the energy user per day/week/month/year.

Specific appliances for which the energy usage has been disaggregated from the entire house profile and compared with TOU rate structures. For example, energy usage corresponding to an air conditioner 510, clothes dryer 520, microwave 530, and dishwasher 540 may be determined. Such usage may then be presented graphically comparing it to TOU structures based on time of day 550. For example, at 570 the appliance usages during the mid-peak (6:00 AM to 12:00 PM) may be seen. At 560 usage of each appliance during peak hours is graphically depicted. The overall use of the appliances may be depicted at 561, which may then be broken down per appliance. For example, the use of air conditioner may be seen at 562, the dryer at 563, the microwave at 5645, and the dishwasher at 565. Comparatively, the usage of the appliances during non-peak hours may also be depicted at 580. Under each representation, a user may be able to select to see how the user may save, which may then present the user with the personalized recommendations as discussed above.

As noted above, devices and methods in accordance with the present invention may be used to display (potential) energy savings when shifting energy uses to various times throughout the day/billing-cycle. Such savings may be calculated at the appliance-level using energy disaggregation, time period dollar equivalent given the user's rate plan and kWh used. Rather than merely being informed of whole-house energy usage (or the cost of such whole-household usage), information may be provided on a per-appliance level of specificity. Such information may include shifting usage of either whole household or of certain appliances from peak to off peak. Savings (or the potential for savings) may be displayed in either historical, real time, or future terms, at the appliance-level of granularity.

In addition, if a home is equipped with solar means and/or energy storage systems, the determination of TOU recommendations may vary. For example, if 5 kWh may be drawn from an energy storage system, TOU recommendations may be contoured to recite something more like "Do not run more than two (2) loads of laundry between 5:30 PM and 9:00 PM." Similarly, during times when solar equipment are providing energy, recommendations may be for less behavior contouring that that which may occur if the solar panels are not actively producing energy. For example, during active solar times a recommendation may be "Do not run pool pump and dryer together between 5:30 PM and 9:00 PM," while if the solar panels are not active the recommendation may be "Do not run pool pump OR dryer between 5:30 PM and 9:00 PM."

A description of an embodiment with several components in communication with each other does not imply that all such components are required. On the contrary a variety of optional components are described to illustrate the wide variety of possible embodiments of the invention. When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for optimizing energy usage in a household, the method comprising:

receiving, using an energy optimization device, entire energy profile data associated with the household including energy provided to the household from solar means and/or energy storage systems present in the household;

obtaining, using the energy optimization device, time of use (TOU) energy pricing structure;

processing, using the energy optimization device, the entire energy profile data to generate disaggregated appliance level data related to one or more appliances used in the household;

retrieving, using the energy optimization device:
historical patterns of energy usage of the household during peak and non-peak time periods;
periods of solar generation; and
maximum loads, if any, supported by the energy storage systems present in the household, if any;

applying a behavior shift analysis on the disaggregated data based at least in part on the TOU energy pricing structure, disaggregated data, and historical patterns of the energy usage, periods of solar generation, and maximum loads supported by the energy storage system, if any, the behavior shift analysis based at least in part on:
determining actual energy usage of the one or more appliances in a first TOU based at least in part on the disaggregated data;
determining actual energy usage of the one or more appliances in a second TOU;
comparing the energy usages in the first TOU and the second TOU; and
determining potential energy savings to the user based on the comparing; and predicting potential energy savings based at least in part on the behavior shift analysis.

2. The method of claim 1, further comprising providing one or more recommendations to one or more users in the household regarding the energy usage of at least one of: the one or more appliances and the household.

3. The method of claim 2, wherein the one or more recommendations comprise at least one of a switching rate plans, change of energy usage behavior during varying time periods, or moving appliance load from peak time periods to non-peak time periods.

4. The method of claim 1, wherein applying time of use behavior shift analysis on the disaggregated data comprises determining potential energy savings based at least in part on changing energy usage behavior during varying time periods.

5. The method of claim 1, wherein the potential energy savings are determined in real time or near real time for one or more appliances or the household.

6. The method of claim 1, further comprising predicting future energy costs associated with one or more appliances based at least in part on historical patterns of energy usage for the one or more appliances.

7. The method of claim 1, wherein the time of use energy pricing structure comprises at least one of peak time period pricing, non-peak time pricing, critical peak pricing, and peak time rebate.

8. The method of claim 1, wherein the TOU energy pricing structure is obtained from an energy utility.

9. An energy optimization device comprising:
one or more hardware processors;
a memory coupled to the one or more hardware processors storing instructions, that when executed by the one or more hardware processors, causes the one or more hardware processors to perform operations comprising:
receiving entire energy profile data associated with the household including energy provided to the household from solar means and/or energy storage systems present in the household;
obtaining time of use (TOU) energy pricing structure;
processing, using the energy optimization device, the entire energy profile data to generate disaggregated appliance level data related to one or more appliances used in the household
retrieving:
  historical patterns of energy usage of the household during peak and non-peak time periods;
  periods of solar generation; and
  maximum loads, if any, supported by the energy storage systems present in the household, if any;
applying a behavior shift analysis on the disaggregated data based at least in part on the TOU energy pricing structure, disaggregated data, and historical patterns of the energy usage, periods of solar generation, and maximum loads supported by the energy storage system, if any, the behavior shift analysis based at least in part on:
  determining actual energy usage of the one or more appliances in a first TOU based at least in part on the disaggregated data;
  determining actual energy usage of the one or more appliances in a second TOU;
  comparing the energy usages in the first TOU and the second TOU; and
  determining potential energy savings to the user based on the comparing; and
predicting potential energy savings based at least in part on the behavior shift analysis.

10. The device of claim 9, wherein the memory stores further instructions that when executed by the one or more hardware processors causes the one or more hardware processors to perform an operation comprising providing one or more recommendations to a user regarding energy usage of one or more appliances or the household.

11. A non-transitory computer readable medium storing instructions for optimizing energy usage in at least one household, that when executed by the one or more hardware processors, causes the one or more hardware processors to perform operations comprising:
receiving, using an energy optimization device, entire energy profile data associated with the household including energy provided to the household from solar means and/or energy storage systems present in the household;
obtaining, using the energy optimization device, time of use (TOU) energy pricing structure;
processing, using the energy optimization device, the entire energy profile data to generate disaggregated appliance level data related to one or more appliances used in the household;
retrieving, using the energy optimization device:
  historical patterns of energy usage of the household during peak and non-peak time periods;
  periods of solar generation; and
  maximum loads, if any, supported by the energy storage systems present in the household, if any;
applying a behavior shift analysis on the disaggregated data based at least in part on the TOU energy pricing structure, disaggregated data, and historical patterns of the energy usage, periods of solar generation, and maximum loads supported by the energy storage system, if any, the behavior shift analysis based at least in part on:
  determining actual energy usage of the one or more appliances in a first TOU based at least in part on the disaggregated data;
  determining actual energy usage of the one or more appliances in a second TOU;
  comparing the energy usages in the first TOU and the second TOU; and
  determining potential energy savings to the user based on the comparing; and
predicting potential energy savings based at least in part on the behavior shift analysis.

12. The non-transitory computer readable medium of claim 11, wherein the medium stores further instructions that when executed by the one or more hardware processors causes the one or more hardware processors to further provide one or more recommendations to the user regarding the energy usage of at least one of: the one or more appliances and the at least one household.

13. The non-transitory computer readable medium of claim 11, wherein the medium stores further instructions that when executed by the one or more hardware processors causes the one or more hardware processors to predict future energy costs associated with one or more appliances or the household.

* * * * *